United States Patent
Ojima et al.

(10) Patent No.: US 12,378,626 B2
(45) Date of Patent: Aug. 5, 2025

(54) HIGH-STRENGTH STEEL SHEET AND METHOD FOR MANUFACTURING THE SAME

(71) Applicant: JFE Steel Corporation, Tokyo (JP)

(72) Inventors: Mayumi Ojima, Tokyo (JP); Yoshimasa Funakawa, Tokyo (JP); Takeshi Yokota, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 604 days.

(21) Appl. No.: 17/796,971

(22) PCT Filed: Dec. 25, 2020

(86) PCT No.: PCT/JP2020/048798
§ 371 (c)(1),
(2) Date: Aug. 2, 2022

(87) PCT Pub. No.: WO2021/161679
PCT Pub. Date: Aug. 19, 2021

(65) Prior Publication Data
US 2023/0071793 A1 Mar. 9, 2023

(30) Foreign Application Priority Data
Feb. 13, 2020 (JP) .................... 2020-021987

(51) Int. Cl.
| | |
|---|---|
| *C21D 6/00* | (2006.01) |
| *B32B 15/01* | (2006.01) |
| *C21D 8/02* | (2006.01) |
| *C21D 9/46* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/08* | (2006.01) |
| *C22C 38/10* | (2006.01) |
| *C22C 38/12* | (2006.01) |
| *C22C 38/14* | (2006.01) |
| *C22C 38/16* | (2006.01) |
| *C22C 38/28* | (2006.01) |
| *C22C 38/38* | (2006.01) |
| *C22C 38/60* | (2006.01) |
| *C23C 2/02* | (2006.01) |
| *C23C 2/06* | (2006.01) |

(Continued)

(52) U.S. Cl.
CPC .............. *C21D 9/46* (2013.01); *B32B 15/013* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/10* (2013.01); *C22C 38/12* (2013.01); *C22C 38/14* (2013.01); *C22C 38/16* (2013.01); *C22C 38/28* (2013.01); *C22C 38/38* (2013.01); *C22C 38/60* (2013.01); *C23C 2/02* (2013.01); *C23C 2/0224* (2022.08); *C23C 2/024* (2022.08); *C23C 2/06* (2013.01); *C23C 2/28* (2013.01); *C23C 2/40* (2013.01); *C21D 2211/001* (2013.01); *C21D 2211/002* (2013.01); *C21D 2211/005* (2013.01); *C21D 2211/008* (2013.01)

(58) Field of Classification Search
CPC .......... B32B 15/013; C21D 1/19; C21D 1/26; C21D 1/60; C21D 2201/05; C21D 2211/001; C21D 2211/002; C21D 2211/005; C21D 2211/008; C21D 6/005; C21D 6/008; C21D 8/0205; C21D 8/0226; C21D 8/0236; C21D 8/0263; C21D 8/0273; C21D 9/46
See application file for complete search history.

(56) References Cited

U.S. PATENT DOCUMENTS

| | | | |
|---|---|---|---|
| 2016/0319415 A1 | 11/2016 | Lee et al. | |
| 2018/0002778 A1 | 1/2018 | Kariya et al. | |

(Continued)

FOREIGN PATENT DOCUMENTS

| | | | |
|---|---|---|---|
| CN | 104508163 A | 4/2015 | |
| CN | 105814227 A | 7/2016 | |

(Continued)

OTHER PUBLICATIONS

Extended European Search Report for European Application No. 20918384.7, dated May 23, 2023, 10 pages.

(Continued)

*Primary Examiner* — Lois L Zheng
(74) *Attorney, Agent, or Firm* — Buchanan Ingersoll & Rooney PC

(57) ABSTRACT

A high-strength steel sheet with a tensile strength of 1,180 MPa or more has a predetermined chemical composition and a steel microstructure in which the area fraction of ferrite is 5% or less, the area fraction of martensite is 2% to 10%, the area fraction of bainite is 5% to 37%, the area fraction of tempered martensite is 42% to 65%, the volume fraction of retained austenite is 3% to 15%, the average grain size of ferrite and bainite is 3 μm or less, in a region extending 50 μm from a surface of the steel sheet in a through-thickness direction, and the average grain size of prior austenite grains is 10 μm or less, the average grain size of the prior austenite grains in the through-thickness direction is 0.9 or less of the average grain size thereof in a rolling direction.

12 Claims, No Drawings

(51) Int. Cl.
    *C23C 2/28*    (2006.01)
    *C23C 2/40*    (2006.01)

(56) References Cited

U.S. PATENT DOCUMENTS

2018/0371570 A1   12/2018   Kim et al.
2020/0071787 A1   5/2020    Natsumeda et al.

FOREIGN PATENT DOCUMENTS

| | | |
|---|---|---|
| CN | 108603269 A | 9/2018 |
| CN | 110662854 A | 1/2020 |
| EP | 2762600 A1 | 8/2014 |
| EP | 2881481 A1 | 6/2015 |
| EP | 3054025 A1 | 8/2016 |
| EP | 3415653 A1 | 12/2018 |
| EP | 3647452 A1 | 5/2020 |
| JP | 5671391 B2 | 2/2015 |
| JP | 5780171 B2 | 9/2015 |
| JP | 2016008310 A | 1/2016 |
| JP | 2016028172 A | 2/2016 |
| JP | 5958669 B1 | 8/2016 |
| JP | 2017510702 A | 4/2017 |
| JP | 2018109222 A | 7/2018 |
| JP | 2018197380 A | 12/2018 |
| WO | 2004042093 A1 | 5/2004 |

OTHER PUBLICATIONS

International Search Report and Written Opinion for International Application No. PCT/JP2020/048798, dated Feb. 22, 2021, 5 pages.
Chinese Office Action with Search Report for Chinese Application No. 202080096035.3, dated Feb. 13, 2023, 12 pages.

HIGH-STRENGTH STEEL SHEET AND METHOD FOR MANUFACTURING THE SAME

CROSS REFERENCE TO RELATED APPLICATIONS

This is the U.S. National Phase application of PCT/JP2020/048798, filed Dec. 25, 2020 which claims priority to Japanese Patent Application No. 2020-021987, filed Feb. 13, 2020, the disclosures of these applications being incorporated herein by reference in their entireties for all purposes.

FIELD OF THE INVENTION

The present invention relates to a high-strength steel sheet with excellent bendability and liquid metal embrittlement resistance and a method for manufacturing the same.

BACKGROUND OF THE INVENTION

Transportation equipment including automobiles has been significantly reduced in weight for the purpose of reducing fuel consumption or energy consumption in operation for global environmental protection and the purpose of improving fuel consumption. High-strength steel sheets are used for weight reduction. High-strength steel sheets with higher strength have a higher weight reduction effect. Steel sheets with a tensile strength of 1,180 MPa grade are to be used in components in which steel sheets with a tensile strength of 980 MPa grade have hitherto been used. In the case of using a steel sheet with a tensile strength of 1,180 MPa grade in a car body structure, formability equivalent to steel sheets with a tensile strength of 980 MPa grade is necessary. Therefore, so-called TRIP steel sheets containing retained austenite are used as steel sheets with a tensile strength of 1,180 MPa grade. However, the TRIP steel sheets are unlikely to be bended and have a limited range of applications because a steep strain gradient is induced in a through-thickness direction by hard martensite produced with the progress of deformation and cracking occurs in a bent portion.

Since reducing the thickness of a high-strength steel sheet for weight reduction shortens the life of a component against corrosion, galvanization is used for the purpose of preventing rust. Therefore, a steel sheet is galvanized or at least one of steel sheets is galvanized and these steel sheets are joined together. Herein, although resistance spot welding, which has high work efficiency, is often used for joining, there is a problem in that cracking occurs at grain boundaries because after zinc liquefied during resistance spot welding permeates grain boundaries in a steel sheet, tensile stress occurs in a welded heat-affected zone. This is called liquid metal embrittlement and is clearly found particularly in high-strength steel sheets with a tensile strength of 1,180 MPa or more. There is a problem in that cracks that cause the reduction in strength of a member are induced in a welded joint by the liquid metal embrittlement.

In view of such circumstances, Patent Literature 1 discloses an ultra-high-strength steel sheet in which the microstructure of a surface portion 30 μm apart from the outermost portion of the steel sheet in a through-thickness direction and the microstructure of an inner portion of the steel sheet are controlled; which is excellent in ductility, bendability, stretch flange formability, and delayed fracture resistance; and which has a tensile strength of 1,350 MPa or more.

Patent Literature 2 discloses a high-strength steel sheet in which the microstructure of a surface layer that is a region extending 50 μm from a surface in a thickness direction and the microstructure of an inner portion of the steel sheet are controlled, which is stably excellent in bendability, and which has a tensile strength of 1,180 MPa or more.

Patent Literature 3 discloses a high-strength steel sheet in which a soft microstructure is produced by forming a decarburized microstructure in a surface such that bendability is enhanced and which has a tensile strength of 900 MPa or more.

Patent Literature 4 discloses a GI TWIP steel sheet which includes a base steel sheet having a microstructure having a Mn content of 10% to 30% and an austenite fraction of 90% by area or more, a Fe—Zn alloy layer on the base steel sheet, and a Zn layer formed on the Fe—Zn alloy layer and in which the Fe—Zn alloy layer has a thickness greater than or equal to a predetermined value and therefore liquid metal embrittlement is unlikely to occur as a technique for avoiding liquid metal embrittlement.

CITATION LIST

Patent Literature

PTL 1: Japanese Patent No. 5671391
PTL 2: Japanese Patent No. 5958669
PTL 3: Japanese Patent No. 5780171
PTL 4: Japanese Unexamined Patent Application Publication (Translation of PCT Application) No. 2017-510702

SUMMARY OF THE INVENTION

However, in Patent Literature 1, Patent Literature 2, and Patent Literature 3, the prior austenite microstructure of a surface layer is not investigated and it is insufficient to ensure liquid metal embrittlement resistance in some cases. In Patent Literature 4, although the Fe—Zn alloy layer is formed so as to have a sufficient thickness such that Zn reacts preferentially with Fe and it is thereby suppressed that Zn becomes liquid zinc under the influence of heat due to welding, the alloy layer is nonuniform and therefore an effect of suppressing liquid metal embrittlement is limited. In addition, the Mn content and the fraction of hard austenite are high and therefore there is a problem in ensuring workability, particularly stretch flange formability.

Aspects of the present invention have been completed to solve the above problems and it is an object according to aspects of the present invention to provide a high-strength steel sheet which has a tensile strength of 1,180 MPa or more and good bendability and in which liquid metal embrittlement is unlikely to occur during welding and a method for manufacturing the same.

The inventors have conducted intensive studies to solve the above problems. As a result, the inventors have obtained findings below.

The inventors have found that bending is possible if no cracks occur in a region which extends 200 μm from a surface of a steel sheet and in which bending strain is severest. The inventors have found that when flat prior austenite grains are in an initial microstructure, strain is relieved in a direction parallel to a sheet surface in a martensite transformation which involves expansion and cracks are unlikely to occur and when a strain gradient in a through-thickness direction is steep due to the martensite transformation, cracks are likely to occur directly under the microstructure underwent the martensite transformation.

Furthermore, the inventors have found that coarse precipitates serve as the origins of cracks during bending. Liquid metal embrittlement occurs because a coating melted during welding permeates grain boundaries in a surface layer of a steel sheet. Herein, when grains are fine and the number of grain boundaries is large, a coating is likely to permeate the grain boundaries and liquid metal embrittlement seems to be likely to occur. When the misorientation of grain boundaries of prior austenite grains is 15° or more, liquid metal is likely to permeate the grain boundaries. The inventors have found that when there is a misorientation distribution of grain boundaries, liquid metal embrittlement is unlikely to occur in a case where grains in a steel microstructure are fine. On the other hand, in order to sufficiently refine grains in a steel microstructure, the loads of hot rolling and cold rolling in the manufacture of a steel sheet are large and it is difficult to manufacture a steel sheet. Therefore, the inventors have performed further investigations, thereby finding that when grains in a steel microstructure in a region extending 50 μm from a surface of a steel sheet are fine, liquid metal embrittlement is effectively suppressed. The inventors have found that when prior austenite grains are elongated in a rolling direction, zinc does not permeate deeply in the through-thickness direction and have also found that zinc is unlikely to permeate grain boundaries with a smaller misorientation. That is, when grains in a steel microstructure are fine and are elongated in a rolling direction and a surface of a steel sheet is provided with a microstructure with a small misorientation, even if a coating permeates grain boundaries during welding, it is conceivable that the coating is unlikely to permeate in a through-thickness direction and tends to spread in an in-plane direction to permeate and liquid metal embrittlement is suppressed.

Aspects of the present invention have been made on the basis of the above findings and are as summarized below.

[1] A high-strength steel sheet with a tensile strength of 1,180 MPa or more has a chemical composition containing C: 0.150% to 0.350%,
Si: 2.0% or less,
Mn: 3.50% or less,
P: 0.040% or less,
S: 0.020% or less,
Al: 0.30% to 2.00%,
N: 0.010% or less, and
Ti: 0.50% or less on a mass basis, the remainder being Fe and incidental impurities, and a steel microstructure in which the area fraction of ferrite is 5% or less,
the area fraction of martensite is 2% to 10%,
the area fraction of bainite is 5% to 37%,
the area fraction of tempered martensite is 42% to 65%,
the volume fraction of retained austenite is 3% to 15%,
the average grain size of ferrite and bainite is 3 μm or less, in a region extending 50 μm from a surface of the steel sheet in a through-thickness direction,
the average grain size of prior austenite grains is 10 μm or less,
the average grain size of the prior austenite grains in the through-thickness direction is 0.9 or less of the average grain size thereof in a rolling direction,
80% or less of grain boundaries of the prior austenite grains are high-angle grain boundaries with a misorientation of 15° or more, and
in a region extending 200 μm from the surface of the steel sheet in the through-thickness direction, the average size of precipitates is 1.0 μm or less,
the average grain size of the prior austenite grains is 15 μm or less, and
the average grain size of the prior austenite grains in the through-thickness direction is 0.9 or less of the average grain size thereof in the rolling direction.

[2] In the high-strength steel sheet specified in [1], the chemical composition further contains at least one of Nb: 0.2% or less,
Cr: 0.50% or less, and
Mo: 0.50% or less on a mass basis.

[3] In the high-strength steel sheet specified in [1] or [2], the chemical composition further contains at least one of B: 0.0050% or less,
Cu: 1.000% or less,
Ni: 1.000% or less,
Co: 0.020% or less,
W: 0.500% or less,
Sn: 0.200% or less,
Sb: 0.200% or less,
V: 0.500% or less,
Ca: 0.0050% or less,
Mg: 0.0050% or less, and
a REM: 0.0050% or less on a mass basis.

[4] The high-strength steel sheet specified in any one of [1] to [3] includes a zinc-coated layer on the surface of the steel sheet.

[5] A method for manufacturing a high-strength steel sheet includes heating a steel slab having the chemical composition specified in any one of [1] to [3] to an austenite single-phase region; hot-rolling the steel slab at a finish rolling entry temperature of 950° C. to 1,150° C., a finish rolling delivery temperature of 850° C. to 950° C., and a rolling speed of 600 mpm or more in a final rolling pass; performing water cooling after a lapse of 0.5 seconds or more after the finish of hot rolling; performing coiling at a coiling temperature of 400° C. to 650° C.; performing cold rolling with a coefficient of friction of 0.25 to 0.45 at a cold rolling reduction of 50% to 65% after pickling; subsequently performing annealing at an annealing temperature of 750° C. to 900° C. for a holding time of 5 seconds to 500 seconds; performing cooling to 550° C. or lower thereafter; and subsequently performing a heat treatment at 300° C. to 480° C. for 10 seconds or more.

[6] In the method for manufacturing the high-strength steel sheet specified in [5], a galvanization treatment is performed after the heat treatment.

[7] In the method for manufacturing the high-strength steel sheet specified in [6], the galvanization treatment is a hot-dip galvanization treatment.

[8] In the method for manufacturing the high-strength steel sheet specified in [7], the hot-dip galvanization treatment is a galvannealing treatment.

According to aspects of the present invention, a high-strength steel sheet which has a tensile strength of 1,180 MPa or more and good bendability and in which liquid metal embrittlement is unlikely to occur during welding is obtained.

In accordance with aspects of the present invention, the term "high strength" refers to a tensile strength of 1,180 MPa or more.

DETAILED DESCRIPTION OF EMBODIMENTS OF THE INVENTION

A chemical composition of a high-strength steel sheet according to aspects of the present invention is described below. In description below, "%" that expresses the unit of the content of each component means "mass %".

C: 0.150% to 0.350%

C is an element which is important in enhancing the strength of steel and which forms retained austenite. In steel, although an increase in strength generally reduces formability, formability can be enhanced by a TRIP effect due to the formation of retained austenite even at high strength. Therefore, C is an element which is important in enhancing formability. When the content of C is less than 0.150%, it is difficult to ensure strength. When the content of C is less than 0.150%, prior austenite grains in a region extending 50 μm from a surface of a steel sheet in a through-thickness direction coarsen and liquid metal embrittlement is likely to occur. Thus, the C content is set to 0.150% or more. On the other hand, when the C content is more than 0.350%, the difference in hardness between ferrite, which is a soft phase, and martensite, which is a hard phase, increases and bendability decreases. Thus, the C content is set to 0.350% or less. The C content is preferably 0.170% or more and is preferably 0.300% or less.

Si: 2.0% or Less

Si is an element that strengthens steel by solid solution strengthening and contributes to the enhancement of strength. In addition, Si suppresses the formation of cementite to increase bendability, also suppresses the formation of cementite at grain boundaries, and therefore has an effect of suppressing liquid metal embrittlement. However, when too much Si is contained, ferrite is likely to be formed and strength decreases. In addition, precipitates in a region extending 200 μm from a surface of a steel sheet in a through-thickness direction coarsen, which causes a reduction in bendability. Therefore, the content of Si is set to 2.0% or less. The Si content is preferably 1.5% or less. The Si content is preferably 0.2% or more from the viewpoint of suppressing the precipitation of cementite. The Si content is more preferably 0.4% or more.

Mn: 3.50% or Less

Mn is an element that enhances hardenability to increase the strength of steel, suppresses the formation of cementite at grain boundaries, too, and therefore enhances bendability. When the content of Mn is more than 3.50%, segregation is likely to occur and bendability decreases. Therefore, the Mn content is set to 3.50% or less. The Mn content is preferably 1.0% or more. The Mn content is preferably 3.00% or less.

P: 0.040% or Less

P segregates at grain boundaries to deteriorate bendability and facilitates the permeation of zinc to promote liquid metal embrittlement. In addition, P causes the deterioration of weldability and reduces the alloying rate when a zinc coating is alloyed, thereby impairing the quality of the zinc coating. Therefore, the content of P is set to 0.040% or less. The P content is preferably 0.020% or less. Although the P content is preferably reduced as much as possible, 0.005% P is incidentally contained in terms of manufacture in some cases.

S: 0.020% or Less

S is likely to form manganese sulfide, deteriorates bendability, and reduces the quenching hardenability of Mn. Therefore, when the content of S is more than 0.020%, no desired strength is obtained. In addition, S embrittles grain boundaries of prior austenite grains and zinc is likely to permeate. Therefore, the S content is set to 0.020% or less. The S content is preferably 0.010% or less. Although the S content is preferably reduced as much as possible, 0.0004% S is incidentally contained in terms of manufacture in some cases.

Al: 0.30% to 2.00%

Al is an element that is necessary for deoxidization. Furthermore, Al is an element that is necessary to suppress the formation of carbides such that retained austenite is likely to be formed. When the content of Al is less than 0.30%, retained austenite is likely to be transformed into martensite, which is hard, at bending and therefore bendability deteriorates. Therefore, the Al content is set to 0.30% or more. The Al content is preferably set to 0.40% or more. On the other hand, when the Al content is more than 2.00%, coarse precipitates are formed at grain boundaries of prior austenite grains. As a result, bendability deteriorates. Thus, the Al content is set to 2.00% or less. The Al content is preferably set to 1.50% or less.

N: 0.010% or Less

N combines with Al and Ti to form coarse precipitates to deteriorate bendability. The amount of N is preferably small. The content of N is set to 0.010% or less because of limitations of manufacturing techniques. The N content is preferably 0.005% or less. The N content is preferably 0.001% or more from the viewpoint of manufacturing costs.

Ti: 0.50% or Less

Ti inhibits the formation of coarse Al nitrides (coarse precipitates) to make an effect of Al significant. When the content of Ti is more than 0.50%, coarse precipitates are formed to deteriorate bendability. Therefore, the Ti content is set to 0.50% or less. The Ti content is preferably 0.30% or less and more preferably 0.25% or less. The Ti content is preferably 0.01% or more from the viewpoint of manufacturing costs.

Fundamental components according to aspects of the present invention are as described above. At least one of Nb: 0.2% or less, Cr: 0.50% or less, and Mo: 0.50% or less may be contained depending on purposes. Reasons for limiting each element are described below.

Nb: 0.2% or Less

Nb has an effect of refining grains to enhance bendability and suppressing liquid metal embrittlement. In order to obtain the above effect, the content of Nb is preferably 0.005% or more. The Nb content is more preferably 0.006% or more and furthermore preferably 0.007% or more. However, when the Nb content is more than 0.2%, coarse precipitates are formed to reduce bendability. Therefore, the upper limit of the Nb content is preferably set to 0.2%. The Nb content is more preferably 0.018% or less and furthermore preferably 0.016% or less.

Cr: 0.50% or Less, Mo: 0.50% or Less

Cr and Mo enhance hardenability to increase the strength of steel. In addition, Cr and Mo allow retained austenite to be likely to be formed and enhance strength and ductility together. On the other hand, adding too much Cr and Mo form precipitates at grain boundaries to deteriorate bendability. Therefore, it is preferable that the upper limit of the content of Cr is set to 0.50% and the upper limit of the content of Mo is set to 0.50%. Cr is more preferably 0.45% or less and Mo is more preferably 0.45% or less. Cr is preferably 0.005% or more. Mo is preferably 0.005% or more.

In accordance with aspects of the present invention, at least one of B, Cu, Ni, Co, W, Sn, Sb, V, Ca, Mg, and a REM may be appropriately further contained.

B: 0.0050% or Less

B is an element capable of enhancing hardenability without reducing the martensite transformation start temperature, can suppress the formation of ferrite, and therefore can be used to achieve a tensile strength of 1,180 MPa or more. When the content of B is more than 0.0050%, cracking occurs in a steel sheet in hot rolling to reduce the ultimate deformability of steel and therefore bendability decrease. Thus, when B is contained, the content thereof is preferably set to 0.0050% or less. The B content is more preferably set to 0.0001% or more and furthermore preferably 0.0002% or more. The B content is more preferably set to 0.0030% or less.

Cu: 1.000% or Less

Cu has a role as a solid solution hardening element, stabilizes austenite in the course of cooling during continuous annealing, can suppress the formation of ferrite, and therefore can be used to achieve a tensile strength of 1,180 MPa or more. When the content of Cu is more than 1.000%, a large number of coarse precipitates and inclusions are formed to reduce the ultimate deformability of steel and therefore bendability decreases. Thus, when Cu is contained, the content thereof is preferably set to 1.000% or less. The Cu content is more preferably set to 0.005% or more. The Cu content is more preferably set to 0.700% or less.

Ni: 1.000% or Less

Ni is an element that enhances hardenability, can suppress the formation of ferrite, and therefore can be used to achieve a tensile strength of 1,180 MPa or more. When the content of Ni is more than 1.000%, coarse precipitates and inclusions increase in number to reduce the ultimate deformability of steel and therefore bendability decreases. Thus, when Ni is contained, the content thereof is preferably set to 1.000% or less. The Ni content is more preferably set to 0.005% or more. The Ni content is more preferably set to 0.450% or less.

Co: 0.020% or Less

Co is an element that is effective in spheroidizing the shape of inclusions to enhance the ultimate deformability of a steel sheet. When the content of Co is more than 0.020%, a large number of coarse precipitates and inclusions are formed to reduce the ultimate deformability of steel and therefore it is more difficult to achieve bendability. Thus, when Co is contained, the content thereof is preferably set to 0.020% or less. The Co content is more preferably set to 0.001% or more. The Co content is more preferably set to 0.010% or less.

W: 0.500% or Less

W is effective in precipitation-strengthening steel and may be contained as required. However, when W is more than 0.500%, the area fraction of martensite, which is hard, is too large and the number of microvoids at grain boundaries of martensite increases in a bending test. Furthermore, the propagation of cracks proceeds and bendability decreases in some cases. Thus, when W is contained, the content thereof is preferably set to 0.500% or less. The W content is more preferably set to 0.001% or more. The W content is more preferably set to 0.300% or less.

Sn: 0.200% or Less, Sb: 0.200% or Less

Sn and Sb are added as required from the viewpoint of suppressing the decarburization of a region of about several tens of micrometers of a surface layer of a steel sheet, the decarburization being caused by the nitriding or oxidation of a surface of the steel sheet. Sn and Sb suppress such nitriding or oxidation, prevent the reduction in area fraction of martensite in a surface of a steel sheet, are effective in ensuring tensile strength, and therefore may be contained as required. When the content of each of Sn and Sb is more than 0.200%, coarse precipitates and inclusions increase in number to reduce the ultimate deformability of steel and therefore it is more difficult to ensure bendability. Thus, when Sn and Sb are contained, the content of each of Sn and Sb is preferably set to 0.200% or less. The content thereof is more preferably set to 0.001% or more. The content thereof is more preferably set to 0.100% or less.

V: 0.500% or Less

V has an effect of refining grains to enhance bendability and suppressing liquid metal embrittlement and is therefore added as required. When the content of V is more than 0.500%, coarse precipitates are formed to reduce bendability. Thus, when V is contained, the upper limit of the content thereof is preferably set to 0.500%. The V content is more preferably set to 0.001% or more. The V content is more preferably set to 0.300% or less.

Ca: 0.0050% or Less, Mg: 0.0050% or Less

Ca and Mg are elements which are used for deoxidization and which are effective in spheroidizing the shape of sulfides to enhance the ultimate deformability of a steel sheet. When the content of each of Ca and Mg is more than 0.0050%, a large number of coarse precipitates and inclusions are formed to reduce the ultimate deformability of steel and therefore it is more difficult to ensure bendability. Thus, when Ca and Mg are contained, the content of each of Ca and Mg is preferably set to 0.0050% or less. The content thereof is more preferably set to 0.001% or more. The content thereof is more preferably set to 0.0030% or less.

REM: 0.0050% or Less

A REM is an element that is effective in spheroidizing the shape of inclusions to enhance the ultimate deformability of a steel sheet. When the content of the REM is more than 0.0050%, a large number of coarse precipitates and inclusions are formed to reduce the ultimate deformability of steel and therefore it is more difficult to ensure bendability. Thus, when the REM is contained, the content thereof is preferably set to 0.0050% or less. The content thereof is more preferably set to 0.001% or more. The content thereof is more preferably set to 0.0030% or less.

The remainder are Fe and incidental impurities.

Next, a steel microstructure according to aspects of the present invention is described.

Area Fraction of Ferrite: 5% or Less

Setting the area fraction of ferrite to 5% or less enables a desired tensile strength to be obtained. On the other hand, when the area fraction of ferrite is more than 5%, the difference in hardness between ferrite, which is a soft phase, and martensite, which is a hard phase, increases and bendability decreases. When the area fraction of ferrite, which is a soft phase, is too large, it is difficult to ensure a desired tensile strength. Thus, the area fraction of ferrite is set to 5% or less. The area fraction of ferrite is preferably set to 4% or less and more preferably 3% or less. Even if the area fraction of ferrite is 0%, an effect according to aspects of the present invention is obtained. In order to enhance ductility, the area fraction of ferrite is preferably set to 1% or more. The area fraction of ferrite is more preferably set to 2% or more.

Area Fraction of Martensite: 2% to 10%

In order to achieve a desired tensile strength, the area fraction of martensite needs to be set to 2% or more. In order to ensure good bendability, the area fraction of martensite needs to be set to 10% or less. The area fraction of martensite is preferably 3% or more. The area fraction of martensite is preferably 8% or less.

Area Fraction of Bainite: 5% to 37%

Bainite contributes to increasing strength. In order to achieve a desired tensile strength, the area fraction of bainite needs to be set to 5% or more. When the area fraction is more than 37%, tensile strength is too high and bendability deteriorates. Therefore, the area fraction is set to 37% or less. The area fraction of bainite is preferably 15% or more. The area fraction of bainite is preferably 35% or less.

Area Fraction of Tempered Martensite: 42% to 65%

In order to ensure good bendability, the area fraction of tempered martensite needs to be set to 42% or more. When the area fraction of tempered martensite is too large, a tensile strength of 1,180 MPa or more cannot be achieved. Therefore, the area fraction of tempered martensite needs to be set to 65% or less. The area fraction of tempered martensite is preferably 45% or more. The area fraction of tempered martensite is preferably 55% or less.

Volume Fraction of Retained Austenite: 3% to 15%

When 3% or more retained austenite is contained, excellent bendability can be obtained. On the other hand, when the volume fraction of retained austenite is more than 15%, many voids are present in martensite in a case where retained austenite is transformed into martensite by working. The voids serve as the origins of cracks and therefore bendability decreases. Thus, the volume fraction of retained austenite is set to 3% to 15%. The volume fraction of retained austenite is preferably 4% or more. The volume fraction of retained austenite is preferably 13% or less and more preferably 5% or more. The volume fraction of retained austenite is preferably set to 12% or less.

Average Grain Size of Ferrite and Bainite: 3 μm or Less

The refinement of ferrite and bainite grains contributes to bendability. In order to obtain bendability, the average grain size of each of ferrite and bainite needs to be set to 3 μm or less. The average grain size of each of ferrite and bainite is preferably 2 μm or less. The lower limit is not particularly limited and the average grain size of each of ferrite and bainite is preferably 1 μm or more.

A method for observing ferrite, martensite, bainite, tempered martensite, and retained austenite can be identified by a method shown in an example described below. A position at which these microstructures are observed is a position corresponding to one-fourth of the thickness of a steel sheet as described below.

Steel Microstructure in Region Extending 50 μm from Surface of Steel Sheet in Through-Thickness Direction In accordance with aspects of the present invention, in order to suppress liquid metal embrittlement, a steel microstructure in a region extending 50 μm from a surface of the steel sheet in a through-thickness direction is important. In accordance with aspects of the present invention, it is characteristic that in the region extending 50 μm from the steel sheet surface in the through-thickness direction, the average grain size of prior austenite grains is 10 μm or less, the average grain size of the prior austenite grains in the through-thickness direction is 0.9 or less of the average grain size thereof in a rolling direction, and 80% or less of grain boundaries of the prior austenite grains are high-angle grain boundaries with a misorientation of 15° or more. Liquid metal permeates a very surface layer only. When the region extending 50 μm from the steel sheet surface in the through-thickness direction is provided with the above-mentioned microstructures, a desired strength can be obtained and liquid metal embrittlement can be suppressed. Reasons for limiting each microstructure are described below.

Average Grain Size of Prior Austenite Grains: 10 μm or Less

As the grain size of the prior austenite grains is finer, a coating is unlikely to permeate in the through-thickness direction even if the coating permeates grain boundaries during welding. The coating tends to spread in an in-plane direction to permeate and the permeation of liquid metal is suppressed. Therefore, the upper limit is set to 10 μm. The lower limit is not particularly limited and the average grain size of the prior austenite grains is preferably 7 μm or more.

Average Grain Size of Prior Austenite Grains in Through-Thickness Direction being 0.9 or Less of Average Grain Size in Rolling Direction In the prior austenite grains elongated in the through-thickness direction rather than the prior austenite grains elongated in the rolling direction, many grain boundaries perpendicular to a solid-liquid interface are present and therefore liquid metal readily permeates the grain boundaries. Therefore, the upper limit of the ratio of the average grain size in the through-thickness direction to the average grain size in the rolling direction is set to 0.9 ((the average grain size in the through-thickness direction)/(the average grain size in the rolling direction) 0.9). The lower limit is not particularly limited and the ratio of the average grain size in the through-thickness direction to the average grain size in the rolling direction is preferably 0.70 or more.

80% or Less of Grain Boundaries of Prior Austenite Grains being High-Angle Grain Boundaries with Misorientation of 15° or More As the misorientation of grain boundaries is larger, grain boundary energy increases, the structure of the grain boundaries is unstable, voids occur. Therefore, liquid metal is more likely to permeate grain boundaries with a larger misorientation. Thus, in order to suppress liquid metal embrittlement, in the region extending 50 μm from the steel sheet surface in the through-thickness direction, high-angle grain boundaries with a misorientation of 15° or more are set to 80% or less of grain boundaries of the prior austenite grains. The lower limit is not particularly limited and, in the region extending 50 μm from the steel sheet surface in the through-thickness direction, the high-angle grain boundaries with a misorientation of 15° or more are preferably 60% or more of grain boundaries of the prior austenite grains.

Steel Microstructure in Region Extending 200 μm from Surface of Steel Sheet in Through-Thickness Direction In accordance with aspects of the present invention, a steel microstructure in a region extending 200 μm from the steel sheet surface in the through-thickness direction is important in enhancing bendability. In accordance with aspects of the present invention, it is characteristic that in the region extending 200 μm from the steel sheet surface in the through-thickness direction, the average size of precipitates is 1.0 μm or less, the average grain size of prior austenite grains is 15 μm or less, and the average grain size of the prior austenite grains in the through-thickness direction is 0.9 or less of the average grain size thereof in the rolling direction. Although cracks due to bending occur near a surface layer with a large strain, cracks are unlikely to occur in a place that is more than 200 μm deep from the steel sheet surface because of the shape constraint of the surface layer. Therefore, in order to enhance bendability, controlling microstructures in the region extending 200 μm from the steel sheet surface in the through-thickness direction is important. That is, allowing the region extending 200 μm from the steel sheet surface in the through-thickness direction to have the following microstructures enhances bendability: microstructures in which no coarse precipitates are formed and in which a strain gradient from the steel sheet surface in the through-thickness direction is not steep. Reasons for limiting each microstructure are described below.

Average Size of Precipitates: 1.0 μm or Less

Coarse precipitates cause the concentration of strain and the occurrence of cracking during bending. Therefore, the average size of precipitates is set to 1.0 μm or less. In accordance with aspects of the present invention, the precipitates include nitrides, carbides, and carbonitrides. The lower limit is not particularly limited and the average size of the precipitates is preferably 0.2 µm or more.

Average Grain Size of Prior Austenite Grains: 15 µm or Less

As the average grain size of the prior austenite grains is finer, bendability increases. When the average grain size thereof is more than 15 µm, bendability decreases. Therefore, the upper limit thereof is set to 15 µm. The lower limit is not particularly limited and the average grain size of the prior austenite grains is preferably 10 µm or more.

Average Grain Size of Prior Austenite Grains in Through-Thickness Direction being 0.9 or Less of Average Grain Size in Rolling Direction In bending, cracks are unlikely to occur in a place in which no cracks develop in the through-thickness direction. The prior austenite grains elongated in the through-thickness direction rather than the prior austenite grains elongated in the rolling direction are likely to cause cracks when prior austenite is transformed into martensite, so that bendability decreases significantly. Therefore, the upper limit of the ratio of the average grain size of the prior austenite grains in the through-thickness direction to the average grain size in the rolling direction is set to 0.9 ((the average grain size in the through-thickness direction)/(the average grain size in the rolling direction) 0.9). The lower limit is not particularly limited and the ratio of the average grain size in the through-thickness direction to the average grain size in the rolling direction is preferably 0.70 or more.

The steel microstructure in the region extending 50 µm from the steel sheet surface in the through-thickness direction and the steel microstructure in the region extending 200 µm from the steel sheet surface in the through-thickness direction can be determined by a method in an example described below.

The high-strength steel sheet according to aspects of the present invention may include a zinc-coated layer on a surface of the steel sheet.

Next, a method for manufacturing the high-strength steel sheet according to aspects of the present invention is described.

A steel slab having the above chemical composition is heated to an austenite single-phase region and is hot-rolled at a finish rolling entry temperature of 950° C. to 1,150° C., a finish rolling delivery temperature of 850° C. to 950° C., and a rolling speed of 600 mpm or more in a final rolling pass; water cooling is performed after a lapse of 0.5 seconds or more after the finish of hot rolling; and coiling is performed at a coiling temperature of 400° C. to 650° C.

The steel slab may be one melted in any one of a blast furnace, a converter, and an electric arc furnace. The steel slab may be immediately rolled without cooling. The steel slab may be a thin slab. A manufacturing method including a casting-rolling step (a so-called mini-mill) starting from thin slab casting may be used.

Heating to Austenite Single-Phase Region

When the heating temperature is too low, lower than the austenite single-phase region, coarse precipitates are likely to be formed in the region extending 200 µm from the steel sheet surface in the through-thickness direction. The austenite single-phase region is a temperature higher than or equal to an $Ac_3$ transformation temperature. The $Ac_3$ transformation temperature is determined using the following formula:

$$Ac_3 \text{ transformation temperature (° C.)} = 910 - 203\sqrt{(\% C)} + 45 \times (\% Si) - 30 \times (\% Mn) + 11 \times (\% Cr) + 32 \times (\% Mo) + 400 \times (\% Ti) + 200 \times (\% Al)$$

where each of (% C), (% Si), (% Mn), (% Cr), (% Mo), (% Ti), and (% Al) is the content (mass %) of a corresponding element.

Finish Rolling Entry Temperature: 950° C. to 1,150° C.

When the finish rolling entry temperature is higher than 1,150° C., the average grain size of the prior austenite grains in the region extending 50 µm from the steel sheet surface in the through-thickness direction, the average grain size of the prior austenite grains in the region extending 200 µm from the steel sheet surface in the through-thickness direction, and the average grain size of ferrite and bainite in a base material become large and bendability and liquid metal embrittlement resistance decrease. Therefore, the upper limit of the finish rolling entry temperature is set to 1,150° C. On the other hand, when the finish rolling entry temperature is too low, lower than 950° C., the area fraction of ferrite is too large and it is difficult to ensure a tensile strength of 1,180 MPa or more in a steel sheet obtained by annealing after cold rolling. The finish rolling entry temperature is preferably 1,000° C. or higher and is preferably 1,100° C. or lower.

Finish Rolling Delivery Temperature: 850° C. to 950° C.

When the finish rolling delivery temperature is higher than 950° C., the average grain size of the prior austenite grains in the region extending 50 µm from the steel sheet surface in the through-thickness direction becomes large, permeation paths of liquid metal in grain boundaries increase in length, and therefore zinc deeply permeates the steel sheet to promote liquid metal embrittlement. Therefore, the upper limit of the finish rolling delivery temperature is set to 950° C. On the other hand, when the finish rolling delivery temperature is too low, lower than 850° C., the area fraction of ferrite is too large and it is difficult to ensure a tensile strength of 1,180 MPa or more in the steel sheet obtained by annealing after cold rolling. Thus, the finish rolling delivery temperature is set to 850° C. to 950° C. The finish rolling delivery temperature is preferably 870° C. or higher and is preferably 950° C. or lower.

Rolling Speed in Final Rolling Pass: 600 Mpm or More

If the rolling speed in a final rolling pass decreases, then the area fraction of ferrite becomes too large and it is difficult to ensure a tensile strength of 1,180 MPa or more in the steel sheet obtained by annealing after cold rolling. Therefore, the rolling speed is set to 600 mpm or more. The rolling speed is preferably set to 700 mpm or more. The upper limit is not particularly limited and the rolling speed in the final rolling pass is preferably 900 mpm or less.

Water Cooling after Lapse of 0.5 Seconds or More after Finish of Hot Rolling

If cooling is started immediately after hot rolling is finished, then ferrite transformation occurs from unrecrystallized rolled microstructures, so that the average grain size of the prior austenite grains in the region extending 50 µm from the steel sheet surface in the through-thickness direction and the average grain size of the prior austenite grains in the region extending 200 µm from the steel sheet surface in the through-thickness direction become large and the ratio of the average grain size of the prior austenite grains in the through-thickness direction to the average grain size of the prior austenite grains in the rolling direction in the region extending 50 µm from the steel sheet surface in the through-thickness direction and the region extending 200 µm from the steel sheet surface in the through-thickness direction is likely to exceed 0.9. Therefore, in order to promote recrystallization, cooling needs to be started after a lapse of 0.5 seconds or more after the finish of hot rolling. The upper limit is not particularly limited and cooling is preferably started within 2.0 seconds after the finish of hot rolling. Cooling is preferably performed at a cooling rate of 15° C./s to 100° C./s.

Coiling Temperature: 400° C. to 650° C.

As the coiling temperature is lower, microstructures become finer. This is effective in suppressing liquid metal embrittlement. However, when the coiling temperature is lower than 400° C., too much martensite, which is hard, is formed, the rolling load during cold rolling is large, and it is difficult to ensure a desired cold rolling reduction. As a result, it cannot be ensured that in the region extending 50 μm from the steel sheet surface in the through-thickness direction, the average grain size of the prior austenite grains in the through-thickness direction is 0.9 or less of the average grain size thereof in the rolling direction. On the other hand, when the coiling temperature is higher than 650° C., nitrides are likely to coarsen and bendability decreases. Thus, the coiling temperature is set to 400° C. to 650° C. The coiling temperature is preferably 450° C. or higher and is preferably 640° C. or lower.

After hot rolling, pickling is performed. Pickling enables the steel sheet surface to be descaled. Pickling conditions are not particularly limited and pickling may be performed in accordance with common practice.

Next, after pickling, cold rolling is performed with a coefficient of friction of 0.25 to 0.45 at a cold rolling reduction of 50% to 65%.

Coefficient of Friction: 0.25 to 0.45

When the coefficient of friction during cold rolling is less than 0.25, nucleation frequency during annealing is low and the average grain size of the prior austenite grains in the region extending 50 μm from the steel sheet surface in the through-thickness direction becomes large. Therefore, liquid metal is likely to permeate and liquid metal embrittlement is likely to occur. On the other hand, when the coefficient of friction is more than 0.45, strain accumulated in the surface layer is too high. Therefore, frequency in which the misorientation of grain boundaries of prior austenite grains formed in a subsequent annealing step is 15° or more increases. As a result, in the region extending 50 μm from the steel sheet surface in the through-thickness direction, the proportion of grain boundaries of prior austenite grains that have a misorientation of 15° or more does not reach 80% or less. Furthermore, when the coefficient of friction is more than 0.45, the steel sheet surface roughens and no desired tensile strength or bendability is obtained. Thus, the coefficient of friction is set to 0.25 to 0.45. The coefficient of friction is preferably 0.27 or more and is preferably 0.44 or less. The coefficient of friction is the coefficient of friction between a steel sheet and a roll during cold rolling. The coefficient of friction is a value determined by calculation based on the rolling load during cold rolling.

Cold Rolling Reduction: 50% to 65%

When the cold rolling reduction is less than 50%, the ratio of the average grain size in the through-thickness direction to the average grain size in the rolling direction is large in the region extending 50 μm from the steel sheet surface in the through-thickness direction, liquid metal is likely to infiltrate in the through-thickness direction of the steel sheet along grain boundaries, and therefore liquid metal embrittlement is likely to occur. On the other hand, when the cold rolling reduction is more than 65%, coarse precipitates are likely to be formed in the region extending 200 μm from the steel sheet surface in the through-thickness direction. Therefore, the cold rolling reduction is set to 65% or less. Thus, the cold rolling reduction is set to 50% to 65%. The cold rolling reduction is preferably 55% or more and is preferably 60% or less.

After cold rolling, annealing is performed at an annealing temperature of 750° C. to 900° C. for a holding time of 5 seconds to 500 seconds. Thereafter, cooling to 550° C. or lower is performed. Subsequently, a heat treatment is performed in a temperature range of 300° C. to 480° C. for 10 seconds or more.

Annealing Temperature: 750° C. to 900° C., Holding Time: 5 Seconds to 500 Seconds When the annealing temperature is lower than 750° C., austenite transformation is unlikely to occur during annealing. Therefore, the area fraction of ferrite is too large, no desired martensite is obtained, and it is difficult to ensure a tensile strength of 1,180 MPa or more. Furthermore, no predetermined tempered martensite area fraction or retained austenite volume fraction is obtained and bendability deteriorates. On the other hand, when the annealing temperature is higher than 900° C., the average grain size of the prior austenite grains in the region extending 50 μm from the steel sheet surface in the through-thickness direction becomes large. Therefore, molten zinc deeply permeates the steel sheet and liquid metal embrittlement is promoted. Thus, the annealing temperature is set to 750° C. to 900° C. Holding for 5 seconds to 500 seconds in an annealing temperature range of 750° C. to 900° C. is necessary. When the holding time is less than 5 seconds, austenite transformation is unlikely to occur. Therefore, the area fraction of ferrite is too large, no desired martensite is obtained, and it is difficult to ensure a tensile strength of 1,180 MPa or more. Furthermore, no predetermined tempered martensite area fraction or retained austenite volume fraction is obtained and bendability deteriorates. On the other hand, when the holding time is more than 500 seconds, the average grain size of the prior austenite grains in the region extending 50 μm and the region extending 200 μm from the steel sheet surface in the through-thickness direction becomes large, coarse precipitates are formed at grain boundaries, the permeation of molten zinc is promoted, and liquid metal embrittlement is facilitated. In addition, bendability decreases. Therefore, the upper limit is set to 500 seconds. The holding time is preferably 50 seconds or more and is preferably 400 seconds or less.

Cooling Stop Temperature: 550° C. or Lower

Annealing is followed by cooling to a cooling stop temperature of 550° C. or lower. If cooling is stopped at higher than 550° C., no tempered martensite with a desired area fraction is obtained and it is difficult to ensure bendability. Therefore, the cooling stop temperature is set to 550° C. or lower. The cooling stop temperature is preferably 500° C. or less. The lower limit is not particularly limited and the cooling stop temperature is preferably 250° C. or higher.

Heat Treatment Temperature: 300° C. to 480° C., Holding Time: 10 Seconds or More After cooling to 550° C. or lower, a heat treatment is performed in a temperature range of 300° C. to 480° C. When the heat treatment temperature is higher than 480° C., it is difficult to ensure desired retained austenite and bendability decreases. When the heat treatment temperature is lower than 300° C., the area fraction of martensite is too large, no tempered martensite with a desired area fraction is obtained, and bendability deteriorates. Therefore, the heat treatment temperature is set to 300° C. to 480° C. The heat treatment temperature is preferably 350° C. or higher and is preferably 450° C. or lower. When the holding time during the heat treatment is less than 10 seconds, the tempering of martensite is insufficient, the area fraction of martensite is too large, no tempered martensite with a desired area fraction is obtained, and bendability deteriorates. In addition, recrystallization occurs during welding to produce equiaxed grains and therefore liquid metal embrittlement is likely to occur. The holding time is preferably 600 seconds or less.

The obtained steel sheet may be further subjected to a galvanization treatment such as a hot-dip galvanization treatment or an electro galvanization treatment. The hot-dip galvanization treatment is preferably treatment in which a heat-treated steel sheet is dipped in a hot-dip galvanizing bath using, for example, a common continuous galvanizing line and a predetermined amount of a galvanized layer is formed on a surface. Before the heat-treated steel sheet is dipped in the hot-dip galvanizing bath, the temperature of the heat-treated steel sheet is preferably adjusted in the range of 430° C. to 480° C. by reheating or cooling. The temperature of the hot-dip galvanizing bath is preferably 440° C. to 500° C. The hot-dip galvanizing bath may contain Al, Fe, Mg, Si, or the like in addition to pure zinc. The coating weight of the galvanized layer may be adjusted to a desired coating weight by gas wiping or the like and is preferably adjusted to about 45 g/m$^2$ per surface. A zinc-coated layer (the galvanized layer) formed by the hot-dip galvanization treatment may be converted into a galvannealed layer by an alloying treatment as required. Alloying conditions are not particularly limited and the temperature of the alloying treatment is preferably 460° C. to 550° C. In the case of performing the alloying treatment, the concentration of Fe in a coated layer is preferably 9 mass % to 12 mass %. When the galvannealed layer is formed, the effective concentration of Al in the hot-dip galvanizing bath is adjusted in the range of 0.10 mass % to 0.22 mass % from the viewpoint of ensuring a desired coating appearance.

The above allows the high-strength steel sheet according to aspects of the present invention to be obtained.

EXAMPLES

Steels having a chemical composition shown in Table 1, the remainder being Fe and incidental impurities, were obtained by steelmaking using a converter and were cast into steel slabs by a continuous casting method. Next, the obtained steel slabs were hot-rolled, were pickled, were cold-rolled, were annealed after cold rolling, and were heat-treated under conditions shown in Table 2, whereby high-strength cold-rolled steel sheets (CRs) were obtained. Some of the high-strength cold-rolled steel sheets were, after the heat treatment, subjected to a hot-dip galvanization treatment (including an alloying treatment after the hot-dip galvanization treatment), whereby galvanized steel sheets (GIs) and galvannealed steel sheets (GAs) were obtained. For hot-dip galvanizing baths, a zinc bath containing Al: 0.19 mass % was used for the galvanized steel sheets (GIs) and a zinc bath containing Al: 0.14 mass % was used for the galvannealed steel sheets (GAs). The temperature of each bath was set to 465° C. The coating weight was set to 45 g/m$^2$ per surface (double-sided coating) and the GAs were adjusted such that the concentration of Fe in a coated layer was in the range of 9 mass % to 12 mass %.

Test specimens were taken from the obtained steel sheets and were evaluated for microstructure observation, tensile test, flangeability, bendability, and liquid metal embrittlement. Evaluation methods are as described below.

(1) Microstructure Observation

The microstructure fraction (area fraction) of each phase was determined by image analysis using EBSD. An observation surface was polished such that a rolling-direction cross section (L-cross section) of each steel sheet was the observation surface. The observation surface was etched in 1 vol % to 3 vol % nital. A position corresponding to one-fourth of the thickness of the steel sheet from a surface of the steel sheet in a through-thickness direction was measured at 500× magnification. In a BCC-phase region in EBSD, ferrite is recognized as a confidence index (CI) value of 0.79 or more and martensite is recognized as a CI value of 0.38 or less. Bainite is recognized as an acicular microstructure with an aspect ratio of 3 or more by SEM observation. Tempered martensite is a BCC-phase recognized as a CI value of 0.39 to 0.78 in EBSD. Retained austenite is identified as an FCC-phase by EBSD and is therefore distinguished from other microstructures. The area fraction of each microstructure was calculated using the number of measurement points contained in the same region, the distance between the measurement points was set to 0.1 µm, and the accelerating voltage during measurement was set to 15 keV.

The volume fraction of retained austenite was determined by X-ray diffraction. After the steel sheet was polished to a surface 0.1 mm apart from a position corresponding to one-fourth of the thickness of the steel sheet, the steel sheet was further polished 0.1 mm by chemical polishing; the integral intensity ratio of each of diffraction peaks of the {200} plane, {220} plane, and {311} plane of fcc iron and the {200} plane, {211} plane, and {220} plane of bcc iron was measured in a polished surface at the position corresponding to one-fourth of the thickness thereof with an X-ray diffractometer using Co Kα radiation; and obtained nine integral intensity ratios were averaged, whereby the volume fraction of retained austenite was calculated.

The average grain size of ferrite and bainite was determined by SEM observation. After a through-thickness cross section of the steel sheet that was parallel to a rolling direction of the steel sheet was polished, the through-thickness cross section was etched in 1 vol % to 3 vol % nital and 10 fields of view (one field of view was 50 µm×40 µm sized) were observed at a position of one-fourth from a surface of the steel sheet in the through-thickness direction at 1,000× magnification using a SEM (scanning electron microscope). A photograph in which ferrite and bainite grains were identified in advance was taken from a microstructure photograph of the steel sheet using Image-Pro developed by Media Cybernetics Inc. such that the area of each phase could be calculated, the equivalent circle diameter of the ferrite and bainite grains was calculated, and equivalent circle diameters were averaged for each of ferrite and bainite, whereby the average grain size of ferrite and bainite was determined.

The average grain size of prior austenite grains was determined by image analysis using EBSD. A test specimen for microstructure observation was taken from the steel sheet, was polished such that a position corresponding to 50 µm or 200 µm from a surface of the steel sheet in the through-thickness direction in a rolling-direction cross section (L-cross section) was an observation surface, was etched in 1 vol % to 3 vol % nital, the size of individual grains and the number of the grains were determined by image analysis using EBSD, and equivalent circle diameters were calculated and were arithmetically averaged, whereby the average grain size was determined.

The ratio of the grain size of the prior austenite grains in the through-thickness direction to the grain size thereof in the rolling direction was determined by SEM observation. A test specimen for microstructure observation was taken from the steel sheet, was polished such that a position corresponding to 50 μm or 200 μm from a surface of the steel sheet in the through-thickness direction in a rolling-direction cross section (L-cross section) was an observation surface, and was etched in 1 vol % to 3 vol % nital and a plurality of places were observed at random in a range of 50 μm from the steel sheet surface and a range of 200 μm from the steel sheet surface at 1,000× magnification using a SEM (scanning electron microscope: JEOL JSM7001F). Grain boundaries of the prior austenite grains were visually determined. For an obtained SEM image, the ratio of the grain size of the prior austenite grains in the through-thickness direction to the grain size thereof in the rolling direction was measured by an intercept method using a straight line parallel or perpendicular to the rolling direction. More specifically, the distances between intersections of straight lines on a 500 μm straight line and grain boundaries were measured on the SEM image in the through-thickness direction and the rolling direction in accordance with JIS G 0551:2013, a value obtained by simply averaging the distances between the intersections was regarded as the length of a grain in each of the through-thickness direction and the rolling direction, and the ratio of the grain size in the through-thickness direction to the grain size in the rolling direction=the length of the grain in the through-thickness direction/the length of the grain in the through-thickness direction was determined.

The proportion of grain boundaries that were high-angle grain boundaries of the prior austenite grains that had a misorientation of 15° or more in a region extending 50 μm from the steel sheet surface in the through-thickness direction was measured as described below. A test specimen was taken from each obtained steel sheet and was polished such that a rolling-direction cross section (L-cross section) of the steel sheet was an observation surface. On the observation surface, a plurality of 50 μm×50 μm measurement regions were set in a range of 50 μm from a surface and were measured at random by an EBSD method (electron beam accelerating voltage: 15 keV, measurement interval: 0.1 μm step, magnification: 500 times). The ratio of the integrated length of grain boundaries with a misorientation of 15° or more to the integrated length of grain boundaries recognized by EBSD was determined and was used as the value of the proportion of the grain boundaries that were the high-angle grain boundaries of the prior austenite grains that had a misorientation of 15° or more.

Precipitates were determined by optical microscope observation. A rolling-direction cross section (L-cross section) was polished such that a position corresponding to 200 μm from a surface of the steel sheet in the through-thickness direction was an observation surface, a plurality of 1,000× magnification optical micrographs were taken at random, the size of precipitates were determined by an intercept method using a straight line parallel to the rolling direction, and the average of the sizes of all precipitates observed in the micrographs was regarded as the average size of the precipitates.

(2) Tensile Test

A JIS No. 5 tensile test specimen was taken from each steel sheet such that a tensile direction was a direction (C-direction) perpendicular to the rolling direction, a tensile test was performed in accordance with standards of JIS Z 2241 (2011), and tensile characteristics (yield strength YS, tensile strength TS, and elongation after fracture El) were determined. The tensile characteristics were determined to be good in the following case: YS≥950 MPa, TS≥1,180 MPa, and EL≥12%.

(3) Flangeability

A test specimen with a size of 100 mm×100 mm was taken from each steel sheet, a 10 mmφ hole was punched at a clearance of 12%±1% in accordance with standards of JIS Z 2256 (2010), the hole was expanded by lifting a 60° conical punch, the lift of the punch was stopped when a crack penetrated the test specimen in the through-thickness direction, and the hole expanding ratio λ (%) was measured from the diameter of the hole after the penetration of the crack and the diameter of the hole before testing. Flangeability was determined to be good in the case of λ≥45%.

(4) Bendability

Bendability was evaluated on the basis of a V-block method specified in JIS Z 2248. Herein, a bending test was performed in a direction in which the rolling direction was along a bending ridge line. Evaluation samples were taken from five places: ⅛w, ¼w, ½w, ¾w, and ⅞w in terms of the width (w) of the steel sheet in a width direction. In the bending test, whether a crack was present in an outer side of a bent portion was visually checked. The minimum bend radius causing no cracking was defined as the critical bend radius. The critical bend radii of the five places were averaged, whereby the critical bend radius of the steel sheet was determined. In accordance with aspects of the present invention, an R/t of 3.0 or less is determined to be good.

(5) Liquid Metal Embrittlement Resistance

A test specimen with a thickness of 1.2 mm, a width of 150 mm, and a length of 50 mm was taken from each obtained steel sheet. The test specimen was overlaid with a 590 MPa-grade galvanized steel sheet, followed by resistance welding (spot welding). A sheet combination of two lapped steel sheets was subjected to resistance spot welding using a servomotor pressurizing-type single-phase AC (50 Hz) resistance welding machine in such a state that the sheet combination was inclined at an angle of 3°. Welding conditions were a pressurizing force of 4.0 kN and a holding time of 0.2 seconds. The welding current and the welding time were adjusted such that the nugget diameter was 4√t mm (t: the thickness of a high-strength steel sheet). The number of samples is N=2. A nugget test specimen was cut into halves after welding and a cross section was observed with an optical microscope. One in which no crack with a length of 0.1 mm or more was found was rated "○" when liquid metal embrittlement resistance was good. One in which a crack with a length of more than 0.1 mm was found was rated "x". Crack observation was performed with no etching and observation magnification was set to 150 times.

Evaluation results are shown in Table 3.

TABLE 1

| Steel No. | Component (mass %) | | | | | | | | | | | | |
|---|---|---|---|---|---|---|---|---|---|---|---|---|---|
| | C | Si | Mn | P | S | Al | N | Ti | Nb | Cr | Mo | B | Cu |
| A | 0.156 | 1.00 | 2.58 | 0.020 | 0.002 | 1.00 | 0.0052 | 0.016 | — | — | — | — | — |
| B | 0.345 | 0.40 | 1.85 | 0.010 | 0.002 | 1.60 | 0.0035 | 0.016 | — | — | — | — | — |
| C | 0.178 | 1.00 | 3.45 | 0.025 | 0.002 | 1.00 | 0.0016 | 0.016 | — | — | — | — | — |

TABLE 1-continued

| Steel No. | C | Si | Mn | P | S | Al | N | O | Ti | Nb | B | Cr | Mo |
|---|---|---|---|---|---|---|---|---|---|---|---|---|---|
| D | 0.178 | 0.43 | 1.50 | 0.030 | 0.002 | 1.57 | 0.0022 | 0.015 | — | — | — | — | — |
| E | 0.191 | 0.59 | 2.78 | 0.020 | 0.002 | 1.41 | 0.0030 | 0.065 | — | — | — | — | — |
| F | 0.167 | 1.50 | 1.00 | 0.010 | 0.002 | 0.50 | 0.0024 | 0.015 | — | — | — | — | — |
| G | 0.161 | 0.98 | 2.49 | 0.010 | 0.001 | 1.02 | 0.0030 | 0.052 | 0.02 | — | — | — | — |
| H | 0.187 | 1.21 | 3.00 | 0.014 | 0.001 | 0.79 | 0.0021 | 0.015 | 0.05 | — | — | — | — |
| I | 0.152 | 1.30 | 2.78 | 0.013 | 0.001 | 0.70 | 0.0030 | 0.016 | — | 0.21 | — | — | — |
| J | 0.294 | 1.42 | 1.85 | 0.010 | 0.001 | 0.58 | 0.0025 | 0.015 | — | 0.45 | — | — | — |
| K | 0.178 | 1.30 | 2.45 | 0.010 | 0.001 | 0.70 | 0.0024 | 0.016 | — | — | 0.04 | — | — |
| L | 0.341 | 0.50 | 3.00 | 0.030 | 0.002 | 1.50 | 0.0024 | 0.015 | — | — | 0.20 | — | — |
| M | 0.142 | 1.12 | 0.67 | 0.010 | 0.001 | 0.32 | 0.0018 | 0.016 | — | — | — | — | — |
| N | 0.410 | 0.31 | 1.75 | 0.021 | 0.001 | 0.32 | 0.0023 | 0.016 | — | — | — | — | — |
| O | 0.169 | 2.13 | 2.64 | 0.010 | 0.001 | 0.32 | 0.0032 | 0.016 | — | — | — | — | — |
| P | 0.160 | 0.98 | 3.62 | 0.010 | 0.002 | 0.32 | 0.0021 | 0.016 | — | — | — | — | — |
| Q | 0.158 | 0.76 | 2.44 | 0.010 | 0.003 | 1.24 | 0.0158 | 0.016 | — | — | — | — | — |
| R | 0.188 | 0.30 | 2.71 | 0.020 | 0.001 | 0.33 | 0.0026 | 0.510 | — | — | — | — | — |
| S | 0.155 | 1.00 | 2.55 | 0.015 | 0.001 | 0.50 | 0.0045 | 0.015 | — | — | — | 0.0018 | — |
| T | 0.165 | 0.80 | 2.35 | 0.025 | 0.002 | 0.60 | 0.0035 | 0.015 | — | — | — | — | 0.25 |
| U | 0.175 | 0.60 | 2.15 | 0.011 | 0.001 | 0.70 | 0.0025 | 0.011 | — | — | — | — | — |
| V | 0.220 | 0.70 | 1.95 | 0.018 | 0.002 | 0.80 | 0.0015 | 0.011 | — | — | — | — | — |
| W | 0.210 | 0.90 | 2.05 | 0.022 | 0.001 | 0.90 | 0.0055 | 0.025 | — | — | — | — | — |
| X | 0.205 | 1.10 | 2.25 | 0.012 | 0.002 | 1.10 | 0.0015 | 0.025 | — | — | — | — | — |
| Y | 0.195 | 1.30 | 2.45 | 0.025 | 0.001 | 0.95 | 0.0025 | 0.035 | — | — | — | — | — |
| Z | 0.185 | 1.40 | 2.75 | 0.021 | 0.002 | 0.85 | 0.0035 | 0.035 | — | — | — | — | — |
| AA | 0.175 | 1.20 | 2.65 | 0.018 | 0.001 | 0.75 | 0.0045 | 0.022 | — | — | — | — | — |
| AB | 0.165 | 1.00 | 2.85 | 0.016 | 0.002 | 0.55 | 0.0055 | 0.012 | — | — | — | — | — |
| AC | 0.175 | 0.80 | 2.45 | 0.007 | 0.001 | 0.35 | 0.0035 | 0.032 | — | — | — | — | — |

| Steel No. | Component (mass %) | | | | | | | | Ac₃ (° C.) | Remarks |
|---|---|---|---|---|---|---|---|---|---|---|
| | Ni | Co | W | Sn | Sb | V | Ca | Mg | REM | | |
| A | — | — | — | — | — | — | — | — | — | 1004 | Inventive steel |
| B | — | — | — | — | — | — | — | — | — | 1070 | Inventive steel |
| C | — | — | — | — | — | — | — | — | — | 972 | Inventive steel |
| D | — | — | — | — | — | — | — | — | — | 1119 | Inventive steel |
| E | — | — | — | — | — | — | — | — | — | 1072 | Inventive steel |
| F | — | — | — | — | — | — | — | — | — | 971 | Inventive steel |
| G | — | — | — | — | — | — | — | — | — | 1023 | Inventive steel |
| H | — | — | — | — | — | — | — | — | — | 951 | Inventive steel |
| I | — | — | — | — | — | — | — | — | — | 955 | Inventive steel |
| J | — | — | — | — | — | — | — | — | — | 935 | Inventive steel |
| K | — | — | — | — | — | — | — | — | — | 957 | Inventive steel |
| L | — | — | — | — | — | — | — | — | — | 1036 | Inventive steel |
| M | — | — | — | — | — | — | — | — | — | 877 | Comparative steel |
| N | — | — | — | — | — | — | — | — | — | 754 | Comparative steel |
| O | — | — | — | — | — | — | — | — | — | 829 | Comparative steel |
| P | — | — | — | — | — | — | — | — | — | 777 | Comparative steel |
| Q | — | — | — | — | — | — | — | — | — | 1045 | Comparative steel |
| R | — | — | — | — | — | — | — | — | — | 981 | Comparative steel |
| S | — | — | — | — | — | — | — | — | — | 905 | Inventive steel |
| T | — | — | — | — | — | — | — | — | — | 919 | Inventive steel |
| U | 0.25 | — | — | — | — | — | — | — | — | 932 | Inventive steel |
| V | — | 0.008 | — | — | — | — | — | — | — | 952 | Inventive steel |
| W | — | — | 0.25 | — | — | — | — | — | — | 986 | Inventive steel |
| X | — | — | — | 0.05 | — | — | — | — | — | 1030 | Inventive steel |
| Y | — | — | — | — | 0.05 | — | — | — | — | 1009 | Inventive steel |
| Z | — | — | — | — | — | 0.02 | — | — | — | 987 | Inventive steel |
| AA | — | — | — | — | — | — | 0.0008 | — | — | 958 | Inventive steel |
| AB | — | — | — | — | — | — | — | 0.0012 | — | 902 | Inventive steel |
| AC | — | — | — | — | — | — | — | — | 0.0015 | 870 | Inventive steel |

Underlined values: Outside the scope of the present invention.

TABLE 2

| Steel Sheet No. | Steel No. | Hot rolling | | | | | | Cold rolling | |
|---|---|---|---|---|---|---|---|---|---|
| | | Heating temperature ° C. | Finish rolling entry temperature ° C. | Finish rolling delivery temperature ° C. | Rolling speed in final rolling pass mpm | Time elapsed from finish of rolling to start of water cooling seconds | Coiling temperature ° C. | Coefficient of friction | Cold rolling reduction % |
| 1 | A | 1220 | 1055 | 921 | 650 | 1.00 | 460 | 0.28 | 60 |
| 2 | B | 1250 | 1085 | 945 | 710 | 0.80 | 570 | 0.28 | 60 |
| 3 | C | 1230 | 1030 | 931 | 720 | 0.65 | 600 | 0.26 | 55 |

TABLE 2-continued

| | | | | | | | | | |
|---|---|---|---|---|---|---|---|---|---|
| 4 | D | 1210 | 1045 | 911 | 890 | 0.75 | 550 | 0.26 | 51 |
| 5 | E | 1200 | 1035 | 901 | 815 | 1.35 | 410 | 0.29 | 63 |
| 6 | F | 1230 | 1065 | 931 | 665 | 1.05 | 450 | 0.25 | 50 |
| 7 | G | 1220 | 1055 | 921 | 750 | 1.00 | 460 | 0.28 | 60 |
| 8 | H | 1180 | 1020 | 900 | 650 | 0.80 | 640 | 0.32 | 60 |
| 9 | I | 1150 | 1000 | 880 | 700 | 1.00 | 600 | 0.25 | 65 |
| 10 | J | 1170 | 1030 | 920 | 750 | 1.20 | 550 | 0.43 | 50 |
| 11 | K | 1200 | 1050 | 910 | 700 | 1.10 | 500 | 0.32 | 55 |
| 12 | L | 1180 | 1040 | 890 | 650 | 0.90 | 450 | 0.28 | 60 |
| 13 | D | 1100 | 1000 | 900 | 620 | 0.80 | 420 | 0.26 | 65 |
| 14 | A | <u>1080</u> | <u>948</u> | 920 | 700 | 0.60 | 500 | 0.27 | 55 |
| 15 | A | 1270 | <u>1155</u> | 900 | 750 | 1.00 | 550 | 0.31 | 55 |
| 16 | B | 1150 | <u>1000</u> | <u>846</u> | 800 | 1.20 | 600 | 0.27 | 60 |
| 17 | B | 1200 | 1080 | <u>971</u> | 770 | 1.40 | 650 | 0.28 | 55 |
| 18 | B | 1170 | 1000 | <u>860</u> | <u>590</u> | 0.80 | 610 | 0.26 | 65 |
| 19 | C | 1220 | 980 | 880 | <u>650</u> | <u>0.44</u> | 620 | 0.32 | 55 |
| 20 | C | 1200 | 1000 | 900 | 700 | <u>0.60</u> | <u>382</u> | 0.34 | 60 |
| 21 | C | 1220 | 1050 | 910 | 720 | 0.70 | <u>660</u> | 0.27 | 55 |
| 22 | A | 1250 | 1080 | 930 | 680 | 0.80 | 600 | <u>0.23</u> | 60 |
| 23 | A | 1180 | 1020 | 890 | 750 | 1.00 | 620 | <u>0.46</u> | 55 |
| 24 | A | 1200 | 1030 | 870 | 780 | 1.10 | 580 | 0.29 | <u>39</u> |
| 25 | A | 1180 | 1050 | 900 | 800 | 0.70 | 560 | 0.31 | <u>68</u> |
| 26 | H | 1250 | 1085 | 948 | 890 | 0.74 | 594 | 0.30 | 64 |
| 27 | I | 1220 | 1055 | 921 | 750 | 1.20 | 400 | 0.28 | 60 |
| 28 | J | 1240 | 1010 | 905 | 900 | 0.88 | 528 | 0.26 | 62 |
| 29 | K | 1250 | 1085 | 945 | 685 | 0.96 | 506 | 0.30 | 55 |
| 30 | L | 1230 | 1065 | 931 | 920 | 1.22 | 550 | 0.28 | 60 |
| 31 | C | 1280 | 1050 | 920 | 720 | 1.00 | 500 | 0.30 | 55 |
| 32 | G | 1230 | 1055 | 900 | 650 | 1.99 | 410 | 0.26 | 55 |
| 33 | I | 1200 | 1035 | 901 | 815 | 1.35 | 550 | 0.29 | 65 |
| 34 | M | 1220 | 1050 | 950 | 650 | 0.55 | 460 | 0.25 | 55 |
| 35 | <u>N</u> | 1200 | 1000 | 900 | 700 | 0.65 | 500 | 0.27 | 60 |
| 36 | <u>O</u> | 1210 | 1100 | 940 | 750 | 1.10 | 550 | 0.28 | 65 |
| 37 | <u>P</u> | 1230 | 1080 | 880 | 800 | 0.80 | 600 | 0.32 | 60 |
| 38 | <u>Q</u> | 1250 | 1050 | 920 | 850 | 0.70 | 450 | 0.29 | 55 |
| 39 | <u>R</u> | 1240 | 1030 | 890 | 900 | 0.60 | 500 | 0.25 | 50 |
| 40 | <u>S</u> | 1150 | 1040 | 910 | 700 | 0.65 | 600 | 0.26 | 60 |
| 41 | T | 1180 | 1060 | 920 | 750 | 1.10 | 550 | 0.28 | 55 |
| 42 | U | 1220 | 1090 | 930 | 800 | 1.45 | 500 | 0.30 | 50 |
| 43 | V | 1250 | 1100 | 940 | 780 | 0.85 | 450 | 0.29 | 55 |
| 44 | W | 1230 | 1060 | 910 | 740 | 1.15 | 480 | 0.27 | 60 |
| 45 | X | 1210 | 1090 | 940 | 700 | 0.95 | 520 | 0.32 | 65 |
| 46 | Y | 1200 | 1060 | 910 | 660 | 0.75 | 540 | 0.30 | 60 |
| 47 | Z | 1190 | 1040 | 890 | 680 | 1.25 | 600 | 0.28 | 55 |
| 48 | AA | 1170 | 1030 | 880 | 700 | 0.80 | 620 | 0.31 | 50 |
| 49 | AB | 1210 | 1060 | 910 | 750 | 0.90 | 580 | 0.29 | 55 |
| 50 | AC | 1230 | 1080 | 930 | 800 | 1.00 | 540 | 0.27 | 60 |

| | Annealing and heat treatment | | | | | Coating | | |
|---|---|---|---|---|---|---|---|---|
| Steel Sheet No. | Annealing temperature °C. | Holding time seconds | Cooling stop temperature °C. | Holding temperature °C. | Holding time seconds | treatment Alloying temperature °C. | Type | Remarks |
| 1 | 900 | 50 | 450 | 400 | 80 | 490 | GA | Inventive example |
| 2 | 750 | 100 | 400 | 450 | 120 | — | GI | Inventive example |
| 3 | 850 | 45 | 500 | 480 | 230 | — | CR | Inventive example |
| 4 | 830 | 120 | 380 | 310 | 600 | 500 | GA | Inventive example |
| 5 | 880 | 60 | 430 | 480 | 190 | 510 | GA | Inventive example |
| 6 | 800 | 55 | 360 | 410 | 200 | — | GI | Inventive example |
| 7 | 880 | 100 | 280 | 450 | 120 | — | GI | Inventive example |
| 8 | 850 | 10 | 380 | 400 | 50 | — | CR | Inventive example |
| 9 | 860 | 450 | 440 | 420 | 70 | — | CR | Inventive example |
| 10 | 880 | 60 | 430 | 440 | 90 | 530 | GA | Inventive example |
| 11 | 780 | 80 | 440 | 460 | 100 | 480 | GA | Inventive example |
| 12 | 820 | 120 | 460 | 450 | 150 | 500 | GA | Inventive example |
| 13 | 850 | 150 | 420 | 400 | 200 | 510 | GA | Comparative example |
| 14 | 840 | 300 | 360 | 350 | 180 | 530 | GA | Comparative example |
| 15 | 830 | 450 | 370 | 380 | 170 | 520 | GA | Comparative example |
| 16 | 800 | 10 | 380 | 400 | 150 | 500 | GA | Comparative example |
| 17 | 880 | 50 | 390 | 410 | 110 | 480 | GA | Comparative example |
| 18 | 860 | 100 | 460 | 440 | 50 | 470 | GA | Comparative example |
| 19 | 840 | 150 | 480 | 450 | 100 | — | GI | Comparative example |
| 20 | 800 | 200 | 370 | 400 | 200 | — | GI | Comparative example |
| 21 | 850 | 250 | 390 | 380 | 80 | — | GI | Comparative example |
| 22 | 825 | 300 | 410 | 390 | 70 | — | GI | Comparative example |
| 23 | 800 | 200 | 420 | 400 | 50 | — | GI | Comparative example |
| 24 | 860 | 100 | 400 | 420 | 100 | 490 | GA | Comparative example |
| 25 | 880 | 50 | 450 | 440 | 150 | 480 | GA | Comparative example |

TABLE 2-continued

| | | | | | | | | |
|---|---|---|---|---|---|---|---|---|
| 26 | <u>730</u> | 65 | 370 | 390 | 250 | 480 | GA | Comparative example |
| 27 | <u>910</u> | 35 | 250 | 470 | 100 | 470 | GA | Comparative example |
| 28 | <u>880</u> | <u>2</u> | 200 | 300 | 800 | 460 | GA | Comparative example |
| 29 | 860 | <u>510</u> | 220 | 390 | 590 | 530 | GA | Comparative example |
| 30 | 840 | <u>100</u> | 580 | 480 | 450 | 500 | GA | Comparative example |
| 31 | 850 | 210 | <u>420</u> | 280 | 350 | — | CR | Comparative example |
| 32 | 850 | 45 | 500 | <u>500</u> | 230 | — | CR | Comparative example |
| 33 | 880 | 95 | 500 | <u>480</u> | <u>8</u> | — | CR | Comparative example |
| 34 | 850 | 50 | 450 | 450 | <u>100</u> | 500 | GA | Comparative example |
| 35 | 880 | 60 | 400 | 400 | <u>80</u> | 480 | GA | Comparative example |
| 36 | 860 | 80 | 350 | 350 | <u>50</u> | 460 | GA | Comparative example |
| 37 | 790 | 100 | 500 | 400 | 200 | 500 | GA | Comparative example |
| 38 | 840 | 200 | 450 | 420 | 300 | 500 | GA | Comparative example |
| 39 | 900 | 120 | 400 | 400 | 400 | 510 | GA | Comparative example |
| 40 | 840 | 100 | 400 | 390 | 50 | — | CR | Inventive example |
| 41 | 840 | 150 | 380 | 400 | 100 | 500 | GA | Inventive example |
| 42 | 850 | 200 | 360 | 420 | 150 | — | GI | Inventive example |
| 43 | 860 | 250 | 450 | 420 | 500 | 490 | GA | Inventive example |
| 44 | 870 | 300 | 430 | 400 | 400 | 510 | GA | Inventive example |
| 45 | 890 | 150 | 410 | 420 | 300 | — | CR | Inventive example |
| 46 | 880 | 400 | 280 | 440 | 200 | — | GI | Inventive example |
| 47 | 870 | 50 | 300 | 400 | 50 | 530 | GA | Inventive example |
| 48 | 860 | 200 | 340 | 420 | 250 | 520 | GA | Inventive example |
| 49 | 840 | 100 | 380 | 440 | 450 | 490 | GA | Inventive example |
| 50 | 830 | 35 | 420 | 400 | 150 | 480 | GA | Inventive example |

Underlined values: Outside the scope of the present invention.

TABLE 3

| | | Steel sheet microstructure | | | | | | | Metal microstructure in region extending 50 μm from steel sheet surface in through-thickness direction | | |
|---|---|---|---|---|---|---|---|---|---|---|---|
| Steel Sheet No. | Steel No. | Area fraction of ferrite % | Area fraction of martensite % | Area fraction of bainite % | Area fraction of tempered martensite % | Volume fraction of retained austenite % | Average grain size of ferrite μm | Average grain size of bainite μm | Average grain size of prior austenite grains μm | Ratio of grain size of prior austenite in through-thickness direction to grain size in rolling direction | Proportion of high-angle grain boundaries with misorientation of 15° or more among grain boundaries of prior austenite grains % |
| 1 | A | 2.4 | 2.3 | 36.8 | 50.3 | 8.2 | 3.0 | 2.1 | 8.9 | 0.86 | 72 |
| 2 | B | 3.9 | 9.1 | 30.9 | 48.8 | 7.3 | 2.9 | 1.8 | 9.4 | 0.86 | 69 |
| 3 | C | 4.2 | 8.2 | 33.2 | 46.7 | 7.7 | 3.0 | 1.9 | 9.5 | 0.79 | 66 |
| 4 | D | 4.7 | 6.4 | 25.8 | 50.3 | 12.9 | 3.0 | 2.1 | 9.1 | 0.73 | 64 |
| 5 | E | 4.9 | 3.4 | 33.9 | 49.6 | 8.2 | 2.9 | 2.0 | 7.1 | 0.80 | 75 |
| 6 | F | 4.6 | 7.5 | 23.0 | 57.6 | 7.4 | 3.0 | 1.8 | 9.9 | 0.72 | 80 |
| 7 | G | 4.6 | 3.0 | 34.0 | 52.2 | 6.2 | 3.0 | 2.1 | 8.5 | 0.83 | 75 |
| 8 | H | 5.0 | 8.4 | 31.9 | 48.0 | 6.7 | 2.9 | 2.0 | 8.8 | 0.90 | 80 |
| 9 | I | 2.9 | 10.0 | 31.0 | 48.2 | 7.9 | 3.0 | 2.0 | 8.9 | 0.86 | 71 |
| 10 | J | 2.5 | 3.6 | 32.1 | 53.3 | 8.5 | 3.0 | 2.2 | 9.6 | 0.88 | 75 |
| 11 | K | 3.5 | 3.9 | 32.5 | 50.5 | 9.6 | 2.9 | 2.0 | 9.1 | 0.86 | 70 |
| 12 | L | 4.1 | 4.3 | 33.8 | 47.4 | 10.4 | 2.8 | 2.1 | 9.4 | 0.86 | 65 |
| 13 | D | 2.2 | 3.9 | 28.9 | 50.1 | 14.9 | 3.0 | 1.9 | 8.8 | 0.78 | 68 |
| 14 | A | <u>15.4</u> | 2.1 | 30.2 | 42.0 | 10.3 | 2.9 | 1.8 | 8.6 | 0.80 | 70 |
| 15 | A | <u>4.6</u> | 5.1 | 30.7 | 50.1 | 9.5 | <u>5.8</u> | <u>4.0</u> | <u>12.5</u> | 0.93 | 71 |
| 16 | B | <u>14.4</u> | 2.3 | 32.2 | 42.1 | 9.0 | <u>3.0</u> | <u>2.0</u> | <u>9.0</u> | 0.84 | 75 |
| 17 | B | <u>4.6</u> | 9.9 | 26.4 | 50.7 | 8.4 | 2.9 | 2.2 | <u>13.4</u> | 0.88 | 63 |
| 18 | B | <u>13.3</u> | 3.4 | 28.8 | 45.9 | 8.6 | 2.8 | 1.8 | <u>9.5</u> | 0.75 | 70 |
| 19 | C | <u>3.5</u> | 5.9 | 22.5 | 55.3 | 12.8 | 2.8 | 1.9 | <u>11.8</u> | 0.95 | 77 |
| 20 | C | 3.7 | 2.5 | 30.1 | 56.8 | 6.9 | 2.9 | 1.8 | <u>8.8</u> | <u>0.97</u> | 74 |
| 21 | C | 2.5 | 3.9 | 32.2 | 52.6 | 8.8 | 2.9 | 2.0 | 8.7 | <u>0.86</u> | 80 |
| 22 | A | 2.6 | 5.3 | 27.6 | 54.2 | 10.3 | 3.0 | 2.1 | <u>11.3</u> | 0.88 | 79 |
| 23 | A | 3.7 | 3.1 | 30.6 | 50.8 | 11.8 | 3.1 | 2.2 | <u>9.5</u> | 0.81 | 85 |
| 24 | A | 3.1 | 4.5 | 32.2 | 48.3 | 11.9 | 3.2 | 1.9 | 9.2 | <u>0.95</u> | <u>76</u> |
| 25 | A | 4.8 | 3.9 | 27.8 | 53.1 | 10.4 | 3.4 | 1.8 | 8.8 | <u>0.86</u> | 74 |
| 26 | H | <u>53.1</u> | <u>1.1</u> | 15.1 | <u>28.5</u> | <u>2.2</u> | 3.1 | 1.8 | 8.6 | 0.88 | 71 |
| 27 | I | <u>3.8</u> | <u>3.1</u> | 32.8 | <u>52.6</u> | <u>7.7</u> | 3.2 | 1.9 | <u>12.7</u> | 0.91 | 69 |
| 28 | J | <u>64.6</u> | <u>1.3</u> | 12.5 | <u>20.3</u> | <u>1.3</u> | 3.0 | 2.0 | <u>9.3</u> | 0.93 | 65 |
| 29 | K | <u>4.1</u> | <u>8.2</u> | 30.6 | <u>45.6</u> | <u>11.5</u> | 2.9 | 2.0 | <u>12.3</u> | 0.90 | 60 |
| 30 | L | 4.5 | 9.0 | 34.1 | <u>39.5</u> | 12.9 | 2.8 | 2.2 | <u>9.0</u> | <u>0.95</u> | 64 |
| 31 | C | 3.9 | <u>42.7</u> | 27.7 | <u>15.8</u> | 9.9 | 2.8 | 2.2 | 9.4 | <u>0.86</u> | 70 |
| 32 | G | 3.8 | <u>8.7</u> | 30.6 | <u>55.1</u> | <u>1.8</u> | 2.7 | 2.1 | 8.7 | 0.85 | 76 |

TABLE 3-continued

| | | | | | | | | | | |
|---|---|---|---|---|---|---|---|---|---|---|
| 33 | I | 3.6 | <u>44.4</u> | 31.5 | <u>10.2</u> | 10.3 | 2.9 | 2.0 | 8.9 | 0.79 | 80 |
| 34 | M | 2.6 | <u>14.8</u> | 31.9 | <u>46.5</u> | 4.2 | 3.0 | 1.8 | <u>13.1</u> | 0.90 | 70 |
| 35 | <u>N</u> | 2.4 | 7.2 | 24.7 | 55.3 | 10.4 | 3.1 | 1.7 | <u>9.1</u> | 0.88 | 75 |
| 36 | <u>O</u> | 22.8 | 4.5 | 26.8 | 40.1 | 5.8 | 3.2 | 1.9 | 9.3 | 0.87 | 73 |
| 37 | <u>P</u> | <u>3.5</u> | 9.1 | 29.9 | <u>50.4</u> | 7.1 | 3.4 | 2.0 | 8.7 | 0.89 | 62 |
| 38 | <u>Q</u> | 4.5 | 1.6 | 30.2 | 51.2 | 12.5 | 3.0 | 2.1 | 8.8 | 0.90 | 60 |
| 39 | <u>R</u> | 2.5 | 2.8 | 31.1 | 50.5 | 13.1 | 2.8 | 2.2 | 9.0 | 0.85 | 65 |
| 40 | <u>S</u> | 3.9 | 5.8 | 31.6 | 50.3 | 8.4 | 2.8 | 2.0 | 8.8 | 0.80 | 71 |
| 41 | T | 4.4 | 6.2 | 31.2 | 49.4 | 8.8 | 2.9 | 2.1 | 8.9 | 0.81 | 68 |
| 42 | U | 3.8 | 6.3 | 30.8 | 50.5 | 8.6 | 2.9 | 1.8 | 9.4 | 0.81 | 69 |
| 43 | V | 2.2 | 7.2 | 29.9 | 52.0 | 8.7 | 3.0 | 1.9 | 9.3 | 0.82 | 72 |
| 44 | W | 2.1 | 8.3 | 28.2 | 52.1 | 9.3 | 2.9 | 2.0 | 9.5 | 0.83 | 70 |
| 45 | X | 3.6 | 8.1 | 27.3 | 51.9 | 9.1 | 3.0 | 2.4 | 9.3 | 0.81 | 66 |
| 46 | Y | 3.8 | 8.7 | 27.1 | 51.5 | 8.9 | 2.9 | 2.2 | 9.5 | 0.83 | 68 |
| 47 | Z | 2.8 | 4.6 | 31.8 | 52.2 | 8.6 | 2.8 | 2.4 | 9.6 | 0.84 | 74 |
| 48 | AA | 4.2 | 4.9 | 31.2 | 51.3 | 8.4 | 2.8 | 2.4 | 9.6 | 0.82 | 72 |
| 49 | AB | 3.9 | 7.6 | 30.9 | 49.7 | 7.9 | 2.6 | 2.0 | 9.3 | 0.79 | 68 |
| 50 | AC | 4.1 | 6.6 | 28.8 | 51.9 | 8.6 | 2.7 | 1.7 | 9.1 | 0.85 | 70 |

| | Metal microstructure in region extending 200 μm from steel sheet surface in through-thickness direction | | | Mechanical characteristics | | | | | Liquid | | |
|---|---|---|---|---|---|---|---|---|---|---|---|
| Steel Sheet No. | Average size of precipitates μm | Average grain size of prior austenite grains μm | Ratio of grain size of prior austenite in through-thickness direction to grain size in rolling direction — | Yield strength MPa | Tensile strength MPa | Elongation after fracture % | Hole expanding ratio % | Bend-ability | metal embrittlement resistance | Type | Remarks |
| 1 | 0.35 | 14.8 | 0.90 | 969 | 1211 | 13.3 | 59 | 3.0 | ○ | GA | Inventive example |
| 2 | 0.38 | 14.9 | 0.90 | 954 | 1180 | 14.6 | 45 | 3.0 | ○ | GI | Inventive example |
| 3 | 0.41 | 14.5 | 0.85 | 950 | 1185 | 15.1 | 47 | 3.0 | ○ | CR | Inventive example |
| 4 | 0.33 | 15.0 | 0.77 | 954 | 1180 | 17.1 | 46 | 3.0 | ○ | GA | Inventive example |
| 5 | 0.28 | 13.9 | 0.90 | 956 | 1182 | 16.0 | 45 | 3.0 | ○ | GA | Inventive example |
| 6 | 0.31 | 14.5 | 0.75 | 1002 | 1252 | 13.1 | 71 | 2.0 | ○ | GI | Inventive example |
| 7 | 0.44 | 13.6 | 0.80 | 959 | 1186 | 13.5 | 45 | 3.0 | ○ | GI | Inventive example |
| 8 | 0.48 | 14.5 | 0.79 | 952 | 1190 | 17.0 | 65 | 1.5 | ○ | CR | Inventive example |
| 9 | 0.28 | 15.0 | 0.80 | 1042 | 1302 | 13.4 | 59 | 3.0 | ○ | CR | Inventive example |
| 10 | 0.44 | 14.5 | 0.88 | 1010 | 1188 | 16.9 | 55 | 2.0 | ○ | GA | Inventive example |
| 11 | 0.42 | 13.5 | 0.84 | 1030 | 1190 | 17.1 | 50 | 2.5 | ○ | GA | Inventive example |
| 12 | 0.38 | 15.0 | 0.78 | 1025 | 1210 | 16.5 | 45 | 3.0 | ○ | GA | Inventive example |
| 13 | <u>1.2</u> | 14.4 | 0.76 | 1050 | 1230 | 16.3 | 48 | 5.0 | ○ | GA | Comparative example |
| 14 | <u>0.29</u> | 13.8 | 0.89 | 812 | <u>1046</u> | 18.7 | 33 | 4.0 | ○ | GA | Comparative example |
| 15 | 0.41 | <u>16.9</u> | 0.78 | 1080 | <u>1255</u> | 13.5 | 19 | 4.5 | x | GA | Comparative example |
| 16 | 0.33 | <u>13.8</u> | 0.84 | 910 | <u>1066</u> | 16.1 | 22 | 5.0 | ○ | GA | Comparative example |
| 17 | 0.25 | 14.9 | 0.88 | 1012 | <u>1190</u> | 16.8 | 57 | 2.0 | x | GA | Comparative example |
| 18 | 0.36 | 14.4 | 0.75 | 930 | 1080 | 15.2 | 25 | 4.5 | ○ | GA | Comparative example |
| 19 | 0.43 | <u>15.5</u> | <u>0.97</u> | 1030 | <u>1210</u> | 16.6 | 48 | 4.0 | x | GI | Comparative example |
| 20 | 0.29 | <u>14.7</u> | <u>0.74</u> | 1040 | 1220 | 16.4 | 52 | 2.5 | x | GI | Comparative example |
| 21 | <u>1.2</u> | 14.8 | 0.76 | 1010 | 1190 | 16.9 | 55 | 5.0 | ○ | GI | Comparative example |
| 22 | <u>0.33</u> | 14.3 | 0.78 | 1070 | 1260 | 15.9 | 50 | 3.0 | x | GI | Comparative example |
| 23 | 0.37 | 13.2 | 0.80 | 1000 | <u>1120</u> | 15.1 | 51 | 3.5 | x | GI | Comparative example |
| 24 | 0.39 | 14.1 | 0.82 | 1020 | <u>1200</u> | 16.7 | 55 | 2.0 | x | GA | Comparative example |
| 25 | <u>1.2</u> | 13.8 | 0.84 | 1050 | 1230 | 16.3 | 45 | 5.0 | ○ | GA | Comparative example |
| 26 | <u>0.42</u> | 13.5 | 0.86 | 970 | <u>1025</u> | 17.9 | 50 | 3.5 | ○ | GA | Comparative example |
| 27 | 0.49 | 14.7 | 0.88 | 1080 | <u>1250</u> | 15.9 | 52 | 2.5 | x | GA | Comparative example |
| 28 | 0.41 | 13.8 | 0.84 | 920 | <u>1005</u> | 17.8 | 51 | 4.0 | ○ | GA | Comparative example |
| 29 | <u>1.2</u> | <u>15.9</u> | 0.83 | 1090 | <u>1280</u> | 15.7 | 57 | 5.0 | x | GA | Comparative example |
| 30 | <u>0.39</u> | <u>14.3</u> | 0.79 | 1030 | 1220 | 16.4 | 45 | 4.5 | ○ | GA | Comparative example |
| 31 | 0.42 | 13.1 | 0.74 | 1030 | 1590 | 5.5 | 49 | 5.0 | ○ | CR | Comparative example |
| 32 | 0.35 | 13.7 | 0.88 | 1020 | 1190 | 12.1 | 47 | 4.5 | ○ | CR | Comparative example |
| 33 | 0.39 | 14.4 | 0.86 | 1090 | 1610 | 5.4 | 31 | 5.0 | ○ | CR | Comparative example |
| 34 | 0.41 | 13.4 | 0.77 | 1060 | <u>1150</u> | 12.4 | 46 | 3.5 | x | GA | Comparative example |
| 35 | 0.36 | 14.2 | 0.85 | 1020 | <u>1200</u> | 13.8 | 50 | 5.5 | ○ | GA | Comparative example |
| 36 | <u>1.4</u> | 14.1 | 0.81 | 1060 | <u>1055</u> | 16.2 | 55 | 5.0 | ○ | GA | Comparative example |
| 37 | <u>0.29</u> | 13.6 | 0.86 | 1070 | <u>1230</u> | 16.3 | 56 | 4.5 | ○ | GA | Comparative example |
| 38 | <u>1.6</u> | 14.6 | 0.85 | 1030 | 1220 | 16.4 | 48 | 5.5 | ○ | GA | Comparative example |
| 39 | <u>1.2</u> | 14.8 | 0.88 | 1020 | 1200 | 16.7 | 50 | 5.0 | ○ | GA | Comparative example |
| 40 | 0.35 | 14.1 | 0.85 | 983 | 1205 | 15.3 | 53 | 2.5 | ○ | CR | Inventive example |
| 41 | 0.32 | 14.5 | 0.88 | 955 | 1195 | 15.4 | 50 | 2.5 | ○ | GA | Inventive example |
| 42 | 0.33 | 14.7 | 0.77 | 965 | 1210 | 15.5 | 52 | 2.5 | ○ | GI | Inventive example |
| 43 | 0.38 | 14.5 | 0.89 | 975 | 1220 | 15.2 | 50 | 2.5 | ○ | GA | Inventive example |
| 44 | 0.34 | 14.1 | 0.85 | 955 | 1230 | 15.1 | 48 | 2.5 | ○ | GA | Inventive example |
| 45 | 0.45 | 14.2 | 0.75 | 985 | 1240 | 15.1 | 48 | 2.5 | ○ | CR | Inventive example |
| 46 | 0.41 | 13.9 | 0.81 | 975 | 1250 | 15.0 | 49 | 2.5 | ○ | GI | Inventive example |

TABLE 3-continued

| | | | | | | | | | | | |
|---|---|---|---|---|---|---|---|---|---|---|---|
| 47 | 0.43 | 14.8 | 0.88 | 995 | 1280 | 14.5 | 60 | 3.0 | ○ | GA | Inventive example |
| 48 | 0.41 | 14.6 | 0.84 | 980 | 1260 | 14.8 | 55 | 3.0 | ○ | GA | Inventive example |
| 49 | 0.37 | 14.2 | 0.86 | 985 | 1270 | 14.6 | 50 | 3.0 | ○ | GA | Inventive example |
| 50 | 0.39 | 14.5 | 0.88 | 955 | 1230 | 15.1 | 48 | 2.5 | ○ | GA | Inventive example |

Underlined values: Outside the scope of the present invention.

All high-strength steel sheets according to aspects of the present invention had a tensile strength of 1,180 MPa or more and excellent bendability and were excellent in liquid metal embrittlement resistance. However, comparative examples were poor in any of characteristics.

The invention claimed is:

1. A high-strength steel sheet with a tensile strength of 1,180 MPa or more, having
a chemical composition containing
C: 0.150% to 0.350%,
Si: 2.0% or less,
Mn: 3.50% or less,
P: 0.040% or less,
S: 0.020% or less,
Al: 0.30% to 2.00%,
N: 0.010% or less, and
Ti: 0.50% or less on a mass basis, a remainder being Fe and incidental impurities, and
a steel microstructure in which
an area fraction of ferrite is 5% or less,
an area fraction of martensite is 2% to 10%,
an area fraction of bainite is 5% to 37%,
an area fraction of tempered martensite is 42% to 65%,
a volume fraction of retained austenite is 3% to 15%,
an average grain size of ferrite and bainite is 3 µm or less, in a region extending 50 µm from a surface of the steel sheet in a through-thickness direction,
an average grain size of prior austenite grains is 10 µm or less,
the average grain size of the prior austenite grains in the through-thickness direction is 0.9 or less of the average grain size thereof in a rolling direction,
80% or less of grain boundaries of the prior austenite grains are high-angle grain boundaries with a misorientation of 15° or more, and
in a region extending 200 µm from the surface of the steel sheet in the through-thickness direction,
an average size of precipitates is 1.0 µm or less,
the average grain size of the prior austenite grains is 15 µm or less, and
the average grain size of the prior austenite grains in the through-thickness direction is 0.9 or less of the average grain size thereof in the rolling direction.

2. The high-strength steel sheet according to claim 1, wherein the chemical composition further contains at least one selected from at least one of the following groups:
group A: at least one of
Nb: 0.2% or less,
Cr: 0.50% or less, and
Mo: 0.50% or less on a mass basis, and
group B: at least one of
B: 0.0050% or less,
Cu: 1.000% or less,
Ni: 1.000% or less,
Co: 0.020% or less,
W: 0.500% or less,
Sn: 0.200% or less,
Sb: 0.200% or less,
V: 0.500% or less,
Ca: 0.0050% or less,
Mg: 0.0050% or less, and
a REM: 0.0050% or less on a mass basis.

3. The high-strength steel sheet according to claim 1, comprising a zinc-coated layer on the surface of the steel sheet.

4. The high-strength steel sheet according to claim 2, comprising a zinc-coated layer on the surface of the steel sheet.

5. A method for manufacturing a high-strength steel sheet, comprising heating a steel slab having the chemical composition according to claim 1 to an austenite single-phase region; hot-rolling the steel slab at a finish rolling entry temperature of 950° C. to 1,150° C., a finish rolling delivery temperature of 850° C. to 950° C., and a rolling speed of 600 mpm or more in a final rolling pass; performing water cooling after a lapse of 0.5 seconds or more after a finish of hot rolling; performing coiling at a coiling temperature of 400° C. to 650° C.; performing cold rolling with a coefficient of friction of 0.25 to 0.45 at a cold rolling reduction of 50% to 65% after pickling; subsequently performing annealing at an annealing temperature of 750° C. to 900° C. for a holding time of 5 seconds to 500 seconds; performing cooling to 550° C. or lower thereafter; and subsequently performing a heat treatment at 300° C. to 480° C. for 10 seconds or more.

6. A method for manufacturing a high-strength steel sheet, comprising heating a steel slab having the chemical composition according to claim 2 to an austenite single-phase region; hot-rolling the steel slab at a finish rolling entry temperature of 950° C. to 1,150° C., a finish rolling delivery temperature of 850° C. to 950° C., and a rolling speed of 600 mpm or more in a final rolling pass; performing water cooling after a lapse of 0.5 seconds or more after a finish of hot rolling; performing coiling at a coiling temperature of 400° C. to 650° C.; performing cold rolling with a coefficient of friction of 0.25 to 0.45 at a cold rolling reduction of 50% to 65% after pickling; subsequently performing annealing at an annealing temperature of 750° C. to 900° C. for a holding time of 5 seconds to 500 seconds; performing cooling to 550° C. or lower thereafter; and subsequently performing a heat treatment at 300° C. to 480° C. for 10 seconds or more.

7. The method for manufacturing the high-strength steel sheet according to claim 5, wherein a galvanization treatment is performed after the heat treatment.

8. The method for manufacturing the high-strength steel sheet according to claim 6, wherein a galvanization treatment is performed after the heat treatment.

9. The method for manufacturing the high-strength steel sheet according to claim 7, wherein the galvanization treatment is a hot-dip galvanization treatment.

10. The method for manufacturing the high-strength steel sheet according to claim 8, wherein the galvanization treatment is a hot-dip galvanization treatment.

11. The method for manufacturing the high-strength steel sheet according to claim 9, wherein the hot-dip galvanization treatment is a galvannealing treatment.

12. The method for manufacturing the high-strength steel sheet according to claim 10, wherein the hot-dip galvanization treatment is a galvannealing treatment.

\* \* \* \* \*